United States Patent
Ngoh et al.

(10) Patent No.: US 7,464,347 B2
(45) Date of Patent: Dec. 9, 2008

(54) METHOD FOR COLLABORATION OF ISSUE-RESOLUTION BY DIFFERENT PROJECTS IN A PROCESSOR DESIGN

(75) Inventors: Francis C. Ngoh, Plano, TX (US); Jayesh K. Tolia, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 141 days.

(21) Appl. No.: 11/557,555

(22) Filed: Nov. 8, 2006

(65) Prior Publication Data

US 2008/0126412 A1    May 29, 2008

(51) Int. Cl.
*G06F 17/50* (2006.01)

(52) U.S. Cl. ........................................ 716/1

(58) Field of Classification Search .............. 716/1
See application file for complete search history.

(56) References Cited

U.S. PATENT DOCUMENTS

| 6,594,799 B1 * | 7/2003 | Robertson et al. ............ 716/1 |
| 7,299,446 B2 * | 11/2007 | He et al. ...................... 716/18 |
| 2006/0190903 A1 * | 8/2006 | Koo ............................. 716/16 |

* cited by examiner

*Primary Examiner*—Jack Chiang
*Assistant Examiner*—Magid Y Dimyan
(74) *Attorney, Agent, or Firm*—Robert D. Marshall, Jr.; W. James Brady; Frederick J. Telecky, Jr.

(57) ABSTRACT

This invention is a toolset upgrading the basic WEBS system update that facilitates tracking design bugs. This invention provides an effective means for reporting, tracking, and eliminating design bugs in an environment of collaborating projects employing re-useable design hardware modules. This invention provides web-based bug reports and uses a tracking program with a SQL database to store all bugs. This invention allows bug reports sharing, alerting and tracking between many different projects.

5 Claims, 5 Drawing Sheets

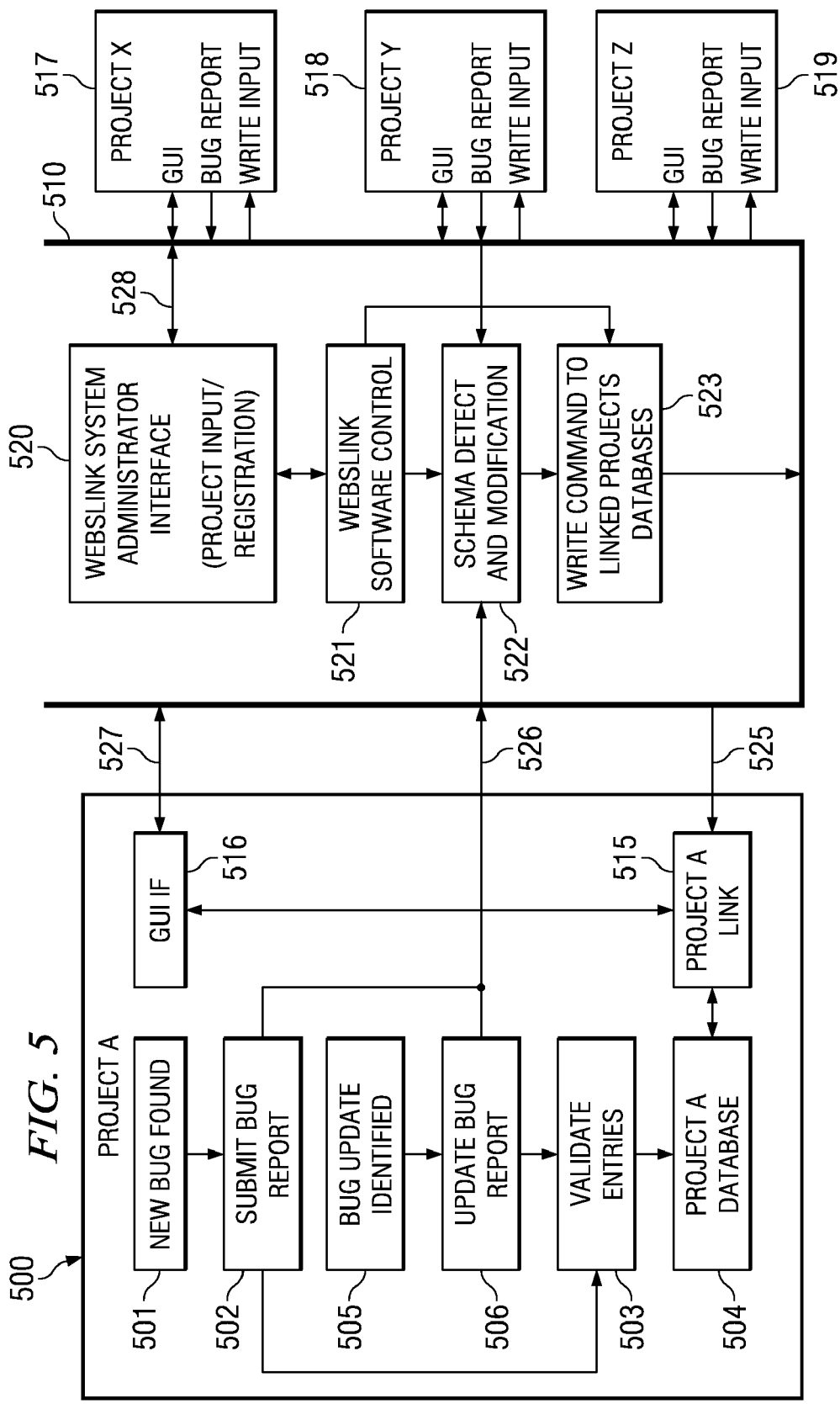

METHOD FOR COLLABORATION OF ISSUE-RESOLUTION BY DIFFERENT PROJECTS IN A PROCESSOR DESIGN

TECHNICAL FIELD OF THE INVENTION

The technical field of this invention is digital data processor design.

BACKGROUND OF THE INVENTION

Very large-scale integration (VLSI) technology has progressed to the point that many new designs are systems on a chip (SOC). In SOC, the design is partitioned into modules each including thousands (often even millions) of active components. These SOC systems are crafted by diverse teams that may be physically separated and sometimes are located in different parts of the world.

Portions of the SOC design include a hierarchy of modules that have a wide range of complexity. It is helpful to categorize this hierarchy in descending order of complexity as follows:

A. Mega-modules: Core processors such as DSP CPU elements, co-processors such as floating point processors and memory elements such as two-level cache memory with sophisticated memory controllers;

B. Super modules: Enhanced direct memory access functions with extensive external memory interfaces EMIF and bus interface functions; and C. Complex modules: first-in-first-out (FIFO) buffers or register file functions having configurability for file size and word width.

These Mega-Modules, Super-Modules, and Complex Modules are the product of a large design investment and a great deal of design evaluation, simulation, and detection of functional and parametric failures. Each module type has a full history recording the results of these exhaustive evaluations. When a module is released by one project for re-use by another project, the need for continued communication between the founder and the user is pre-eminent.

It would be natural to assume that establishing a library for all re-use modules would go a long way to providing the communication. Unfortunately, the library concept sets up another entity between founder and user and suffers from the confusion of ownership and responsibility. For an effective design system, designers of a module (founders) must always remain responsible yet must be relieved of every day communication regarding issues and details relating to the reuse of the module.

Clearly, while a centralized system is needed for communication, this system must have an aspect of decentralization wherein projects may operate autonomously. Modules could be integrated systems that are designed and implemented by engineers engaged with potentially a large number of projects worldwide. Managing issues in these SOC designs thus are not restricted to the business process of one project, but include inter-project communications at a very fine granularity, down to the detail level of the individual design module.

Several bug-tracking tools are available to meet these needs. They are targeted chiefly at tracking issues related to a particular project, and have weak, non-existent, or inappropriately targeted solution for designs with many interdependent collaborative projects. What is needed is a system that will not only allow each individual project to track its own bugs and design issues, but also allow the same seamless tracking/collaboration for upstream, downstream or partner projects affected by the same issue. Collaboration has to be seamless or transparent so that a resolution of the issue provided by members in one project applies immediately to the resolution of the same problem in other affected projects.

In conventional bug tracking tools all issues/bugs detected by one project become limited to the techniques chosen by that project with a set of specific choices on definitions and descriptions for what is referred to as the project schema: (a) bug life, (b) states transition and (c) fields within the report. The bug report then must be separately copied and these schemas must be communicated to the other projects with differently defined schema beyond the bug-tracking tool itself. Typical communications are through e-mails or other indirect communications. This often results in delays and other communication problems caused by the lack of an integrated tool to handle inter-project communications and lack of uniformity across project schema.

FIG. 1 illustrates an example flow diagram of a conventional bug tracking system. The conventional system in this example has N projects which report manually and other projects are notified manually, and related reports are issued manually in all N projects.

Assume the first bug was found 101 in Project 1. Project 1 reports the bug manually to other projects via path 109 and also submits a bug report 102 within its own project for validation 103. Validation is the process by which the bug report is determined to be acceptable in its description of the bug. Upon validation the bug report is written to the project 1 database 104 in native schema. Other projects linked to project 1 receive the new bug report manually via notification path 109 to 111, 109 to 121 and so forth. Each project submits its own bug report 112, 122 in their native schema and then passes these reports on for validation in steps 113 and 123. Upon validation the each bug report is written to the respective project database 114, 124 in native schema.

Similarly, when a bug update is identified 105 in project 1, an update report 106 is written, which will also undergo validation 103 before being written into the project 1 database 104. Update bug reports 105 are passed manually from the bug update step 105 to other project update bug report steps 116 and 126 via path 110. Once the updates are completed in steps 116 and 126, they are validated in steps 113 and 123 and then written to the respective project databases in steps 114 and 124 respectively.

When a bug update is identified in either project 2 115 or project N 125, an update report 116 or 126 is written, which will also undergo validation 113 or 123 before being manually written into the respective project databases 114 and 124. Update bug reports 115 and 125 are likewise passed manually from the bug update steps 115 and 125 to other project update bug report steps via path 110.

SUMMARY OF THE INVENTION

WEBS Teamlink provides an effective means for reporting, tracking, and eliminating design bugs. WEBS Teamlink provides web-based bug reports and uses a tracking program with an SQL database to store all bugs. Besides allowing an individual project to track its own bugs, WEBS Teamlink allows bug reports sharing, alerting and tracking between many different projects. WEBS Teamlink can be employed worldwide in hundreds of design projects in such diverse business ventures as Wireless communications, DSP, and Broadband communications. All bugs/reports in such diverse design activities are filed and communicated effectively.

BRIEF DESCRIPTION OF THE DRAWINGS

These and other aspects of this invention are illustrated in the drawings, in which:

FIG. 5 illustrates a high level view of the WEBS Teamlink system showing graphical user interface, module registration and storage, and communications among users.

DETAILED DESCRIPTION OF PREFERRED EMBODIMENTS

WEBS is the acronym for Web Enhancement and Bug System link. This invention includes WEBS Teamlink tools installed to update a basic WEBS system to facilitate tracking design bugs to eliminate unnecessary burdens on the founder designers of modules used on other projects. WEBS Teamlink also serves to automatically make available the latest bug status on any module used in team-linked projects.

WEBS is a web-based bug reporting and tracking program with an SQL database to store all bugs. WEBS itself allows an individual project to track its own bugs, and WEBS Teamlink allows bug reports sharing, alerting and tracking between teams belonging to many different projects. WEBS Teamlink is applicable to worldwide use in hundreds of design projects in such diverse business ventures as Wireless, DSP, and Broadband. All bugs/reports in Wireless, DSP and Broadband be filed, found and communicated effectively. A GUI interface allows easy inquiry of bug status, easy input of new bugs and bug updates, and timely alerts of new bug status information.

Figure 1:
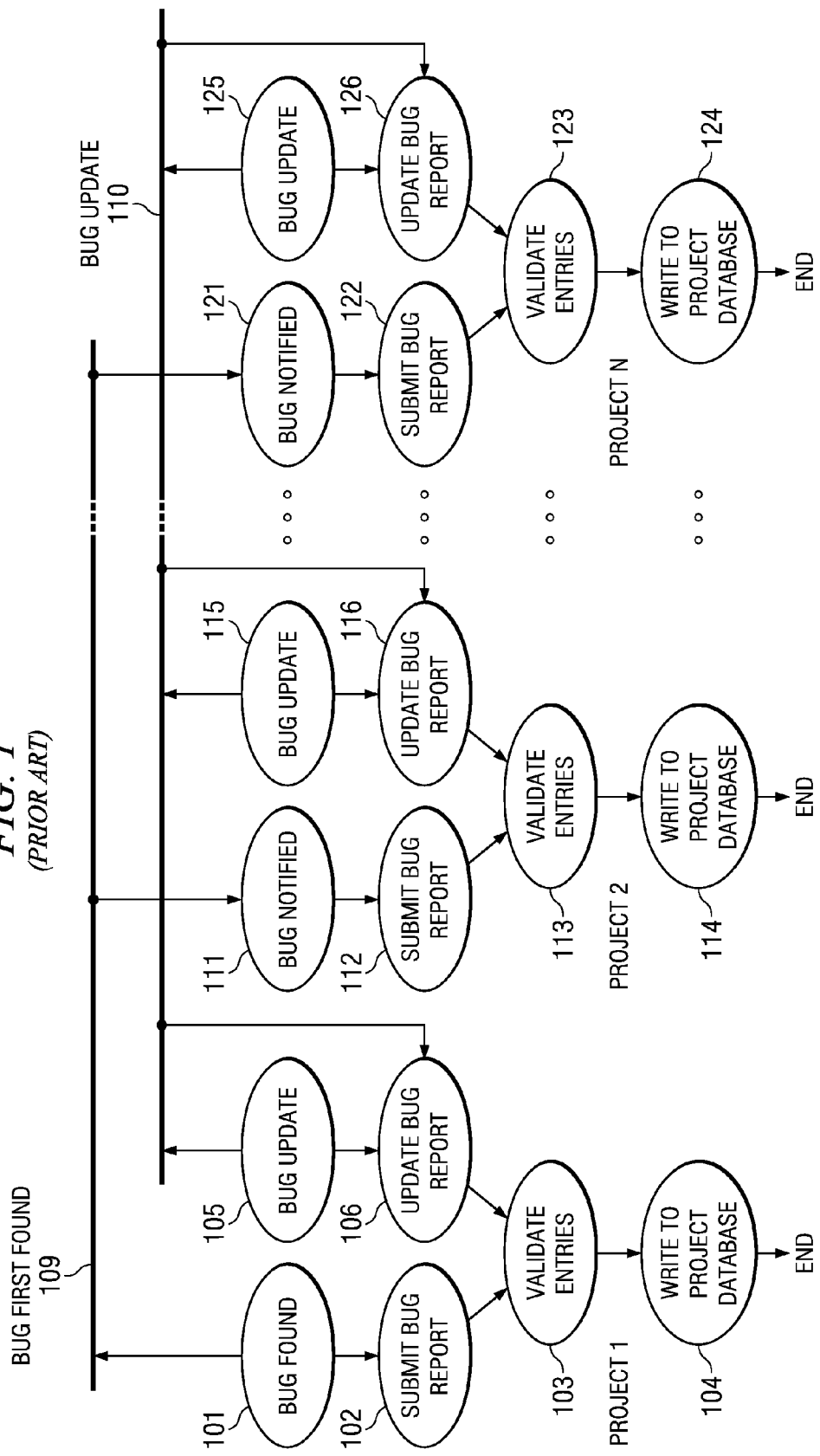
FIG. 1 illustrates a conventional bug tracking system for reporting bugs found and updating existing bug reports to neighboring projects (Prior Art)
Figure 2:
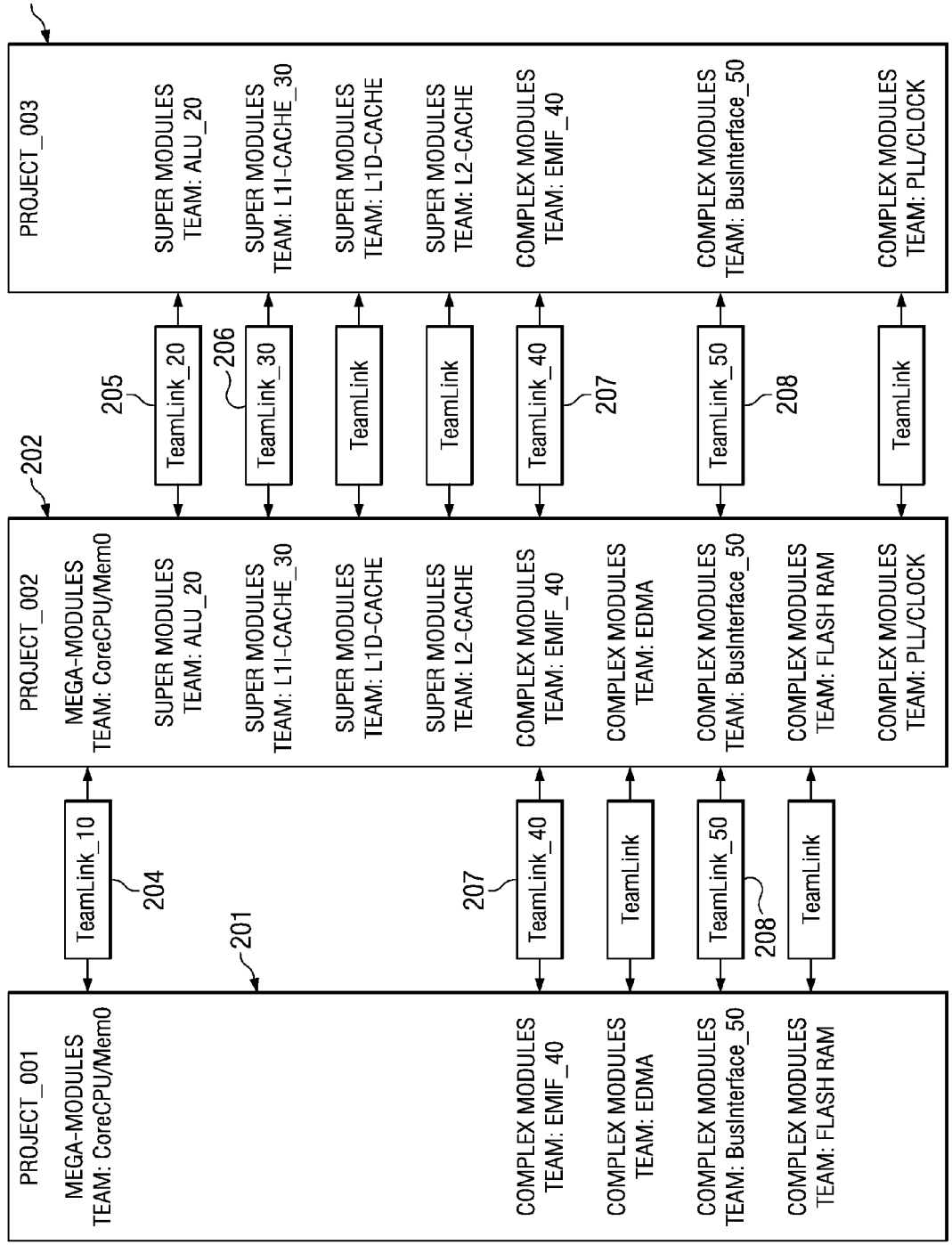
FIG. 2 illustrates the linking of diverse projects using specific individual modules with the WEBS Teamlink concept emphasized.

FIG. 2 illustrates the concept of Team Linking using WEBS Teamlink. Three example projects are illustrated: Project_001 201; Project_002 202; and Project_003 203. For illustration purposes five TeamLinks are identified:

1. TeamLink_10 204 links Project_001 and Project_002, which employ a CoreCPU/Mem0 mega module containing a CPU and Cache Memory elements;

2. TeamLink_20 205 links Project_002 and Project_003, which employ the ALU_20 module;

3. TeamLink_30 206 links Project_002 and Project_003, all of which employ L1I-Cache_30 an instruction cache module;

4. TeamLink_40 207 links Project_001, Project_002, and Project_003, all of which employ EMIF_40 an external memory interface module; and 5. TeamLink_50 208 links Project_001, Project_002, and Project_003, all of which employ BusInterface_50 a bus interface function module.

Figure 3:
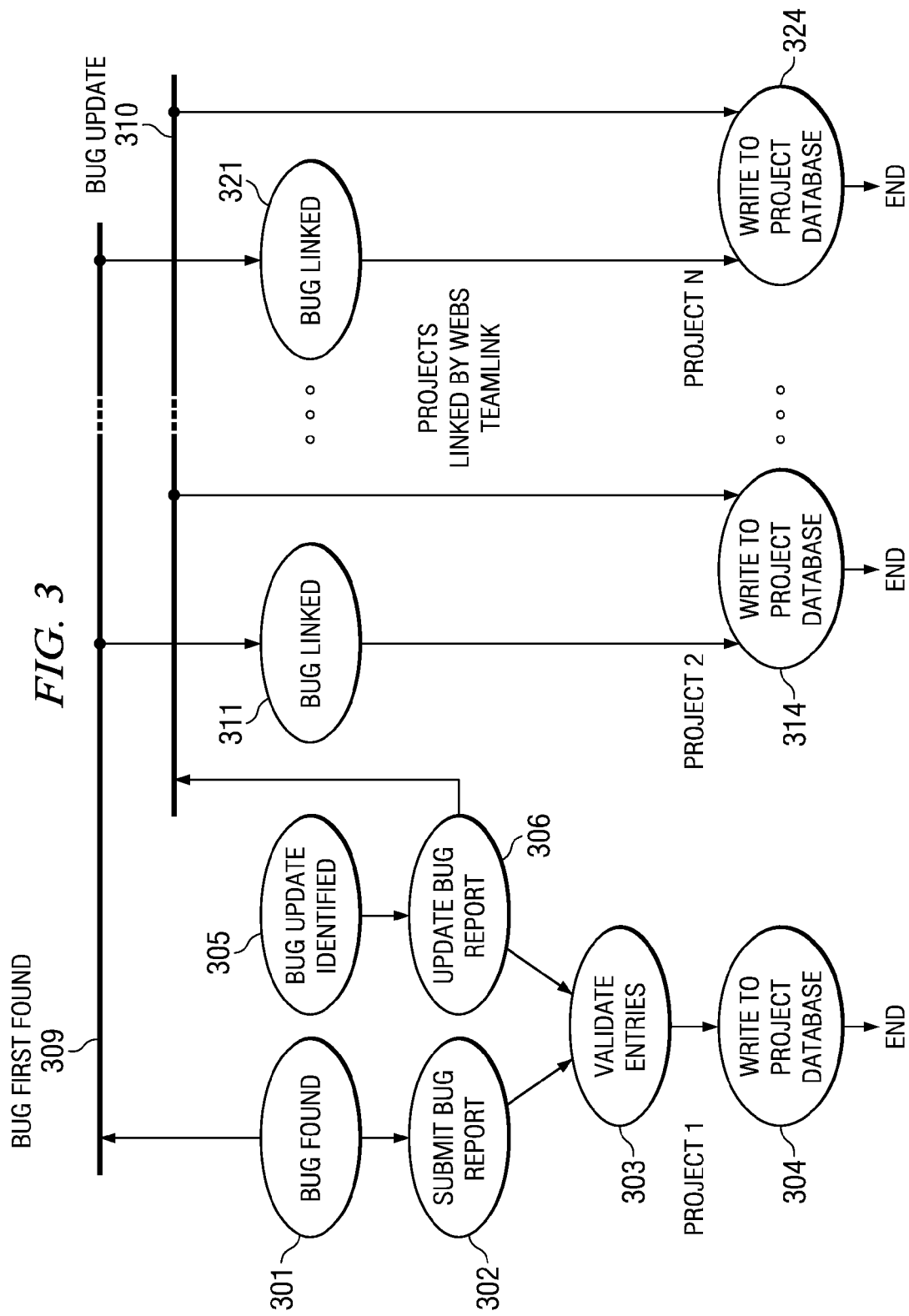
FIG. 3 illustrates the flow diagram for the WEBS Teamlink bug tracking methodology of this invention for reporting bugs found on a specific module and updating existing bug reports on that module to neighboring projects.

FIG. 3 illustrates flow diagram of the operations of the WEBS Teamlink system in an example having a project 1, linked to another N projects all using common modules. Because the project nodes are implemented in software, any node may become the initiating node on the next new bug occurrence.

When a bug in a given module is first found project 1 301, project 1 reports the bug manually to other projects via path 309 and also submits a bug report 302 within its own project for validation 303. Upon validation the bug report is written to the project 1 database 304 in native schema. Other projects linked to project 1 receive the new bug report automatically via link paths 311, 321 and so forth. The linked bugs are written directly to the project databases of each project.

When a bug update is identified in project A 305 an update report 306 is written, which will also undergo validation 303 before being written into the project A database 304. Update bug reports are automatically passed directly from the update bug report step 306 to other project databases 314 through 324 via path 310.

Figure 4:
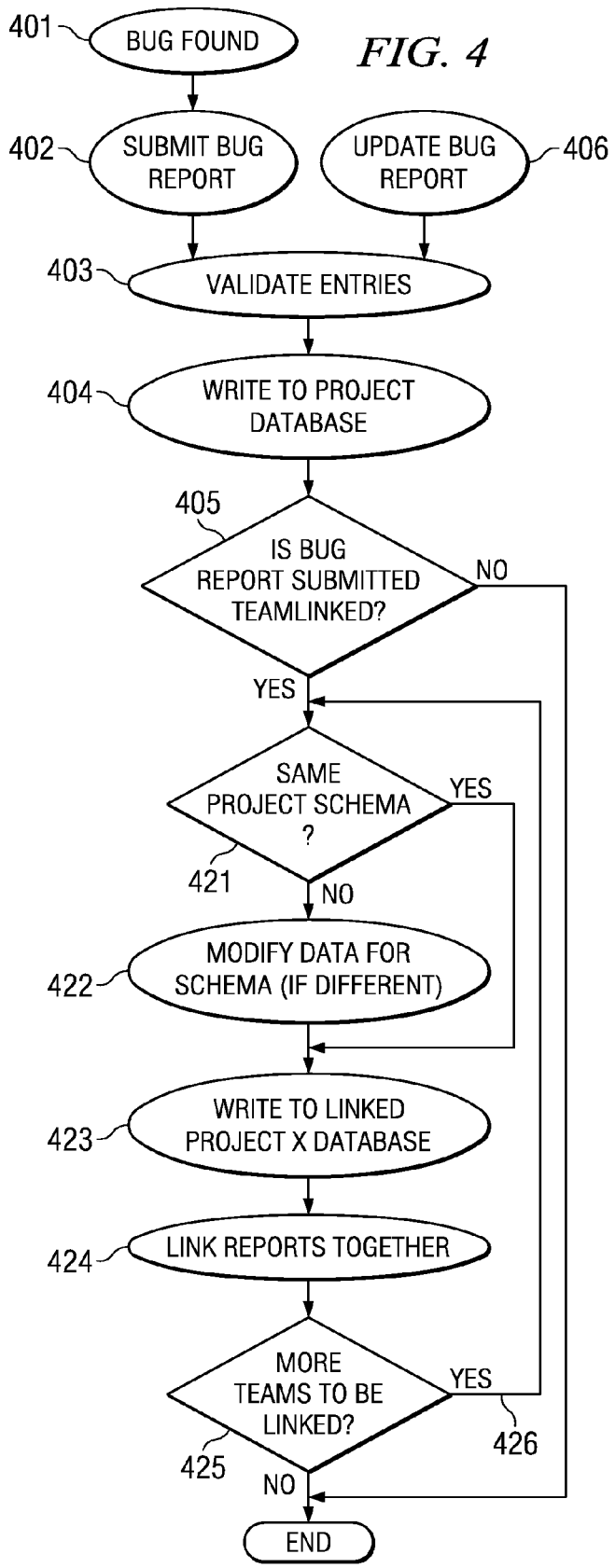
FIG. 4 illustrates the flow diagram for the WEBS Teamlink algorithm of this invention for reporting bugs on a specific module and updating bug reports on that module as new bugs are found and existing bugs are fixed.

FIG. 4 illustrates the WEBS Teamlink algorithm for bugs found and bug updates. For a newly found bug 401 first a bug report is submitted 402 and then is validated 403. Similarly for a bug update 406 the validate step is entered. After validation 403 the results are written to the project database 404 for the newly found bug or bug update. Then a query 405 is performed to determine if the bug report submitted is linked to another project. If No, then the path is complete; if Yes, another query 421 is performed regarding similarity of project schema of initiating and receiving project. For a Yes result in 421 (same project schema) the bug report is written 423 to the linked project database. For a No result in 421 (different project schema) the schema is modified 422 to allow for proper communication and is then written 423 to the linked project database. Then the report is formally linked together by WEBS Teamlink 424 to be available for inter-project communication. Then a query 425 is performed to determine whether more teams need to be linked. If result of 425 is No, the algorithm is complete. If the result of 425 is Yes then these new teams are queried in loop 426 by re-entry into query 421 for each additional teams needing to be linked.

FIG. 5 illustrates another view of the WEBS Teamlink system linking teams in four collaborating projects Project A 500, Project X 517, Project Y 518 and Project Z 519. Blocks 501 through 506 represent elements of the WEBS Teamlink process corresponding to similarly numbered steps in FIG. 4. In addition, FIG. 5 illustrates the links from project A to the WEBS Teamlink processing elements, the software for which can reside on any workstation node on the net serving all the projects involved. The bus 510 links all nodes with procedures and processes represented by blocks 520 through 523. Three clear paths may be identified between a given project and the WEBS Teamlink software modules 520 through 523. These are:

1. Bug Data Send Link 526;
2. Bug Data Receive Link 525; and
3. Graphics user interface Link (GUI) 527.

Block 520 represents the GUI through which a WEBS Teamlink system administrator enters the project link information outlined in FIG. 2. This establishes all links between collaborating projects on diverse types of modules. The WEBS Teamlink software control 521 receives GUI input from the WEBS Teamlink external interface 520 and directs the performance of the algorithm steps of FIG. 4. The Schema Detect and Modification block 522 examines schema link inputs 526 and performs all required schema modification. The write command link 523 carries out communication from the input project top all linked project databases via the bug data link 525. The WEBS Teamlink external interface 520 handles interaction between each project GUI 516 in Project A for example, and the server station 510 via GUI link 528.

What is claimed is:

1. A method for tracking design bugs for library modules shared among a plurality of design projects comprising the steps of:
   submitting a bug report relative to one design library module from one design team;
   storing said bug report in reporting design project library;
   linking said bug report to design project library of all design projects employing said design library module;
   after linking said bug report to another design project library determining whether reporting design project and other design projects employ similar data schemas;
   when said reporting design project and said other design projects employ similar data schemas, then linking said bug reports; and
   when said reporting design project and said other design projects do not employ similar data schemas, then converting said bug report to a data schema of said other design project and then linking said bug reports.

2. The method of claim 1, further comprising the step of:
   validation of each of said bug reports before storing said bug report in said reporting design team project library and linking said bug report to other design project libraries.

3. The method of claim 1, further comprising the steps of:
   storing said bug report in a reporting team design project library; and
   linking said stored bug report to a design project library of all design projects employing said design library module.

4. A method for tracking design bugs for library modules shared among a plurality of design projects comprising the steps of:
   submitting a bug report relative to one design library module from one design team;
   storing said bug report in reporting design project library;
   linking said bug report to design project library of all design projects employing said design library module;
   storing said bug report in a reporting team design project library;
   linking said stored bug report to a design project library of all design projects employing said design library module;
   after linking said bug report to another design project library determining whether said reporting design project said and other design projects employ similar data schemas;
   when said reporting design project and said other design projects employ similar data schemas, then linking said bug reports; and
   when said reporting design project and said other design projects do not employ similar data schemas, then converting said bug report to a data schema of said other design project and then linking said bug reports.

5. The method of claim 4, further comprising the step of:
   validation of each of said bug reports before storing said bug report in said reporting design team project library and linking said bug report to other design project libraries.

* * * * *